United States Patent
Ougarov et al.

(10) Patent No.: US 8,442,938 B2
(45) Date of Patent: May 14, 2013

(54) CHILD DATA STRUCTURE UPDATE IN DATA MANAGEMENT SYSTEM

(75) Inventors: Andrei V. Ougarov, Rancho Santa Margarita, CA (US); Paul D. Carmichael, Laguna Niguel, CA (US)

(73) Assignee: Siemens Aktiengesellschaft, Munich (DE)

( * ) Notice: Subject to any disclaimer, the term of this patent is extended or adjusted under 35 U.S.C. 154(b) by 1717 days.

(21) Appl. No.: 11/035,774

(22) Filed: Jan. 14, 2005

(65) Prior Publication Data

US 2006/0161597 A1 Jul. 20, 2006

(51) Int. Cl.
*G06F 17/00* (2006.01)
*G06F 17/30* (2006.01)

(52) U.S. Cl.
USPC .......................... 707/610; 707/613

(58) Field of Classification Search .................. 707/104, 707/1, 4, 103, 201, 610, 613; 700/245, 2; 395/701
See application file for complete search history.

(56) References Cited

U.S. PATENT DOCUMENTS

| | | | |
|---|---|---|---|
| 5,412,774 A | 5/1995 | Agrawal et al. | |
| 5,414,809 A | 5/1995 | Hogan et al. | |
| 5,487,141 A | 1/1996 | Cain et al. | |
| 5,519,866 A | 5/1996 | Lawrence et al. | |
| 5,566,330 A | 10/1996 | Sheffield | |
| 5,632,022 A | 5/1997 | Warren et al. | |
| 5,760,770 A | 6/1998 | Bliss et al. | |
| 5,764,226 A | 6/1998 | Consolatti et al. | |
| 5,787,283 A | 7/1998 | Chin et al. | |
| 5,825,361 A | 10/1998 | Rubin et al. | |
| 5,864,862 A | 1/1999 | Kriens et al. | |
| 5,907,704 A * | 5/1999 | Gudmundson et al. | 717/100 |
| 5,917,498 A | 6/1999 | Korenshtein | |
| 5,958,012 A | 9/1999 | Battat et al. | |
| 5,970,476 A | 10/1999 | Fahey | |
| 5,980,096 A | 11/1999 | Thalhammer-Reyero | |
| 5,982,362 A | 11/1999 | Crater et al. | |
| 5,991,534 A | 11/1999 | Hamilton et al. | |
| 5,999,940 A | 12/1999 | Ranger | |
| 6,002,853 A | 12/1999 | De Hond | |
| 6,003,036 A | 12/1999 | Martin | |
| 6,014,138 A | 1/2000 | Cain et al. | |
| 6,029,181 A | 2/2000 | Milakovich et al. | |

(Continued)

FOREIGN PATENT DOCUMENTS

| | | |
|---|---|---|
| WO | 03/062934 A1 | 7/2003 |
| WO | 2006/018738 A1 | 2/2006 |
| WO | 2006/039760 A1 | 4/2006 |

*Primary Examiner* — Christyann Pulliam
*Assistant Examiner* — Fariborz Khoshnoodi
(74) *Attorney, Agent, or Firm* — Buckley, Maschoff & Talwalkar LLC

(57) ABSTRACT

A system to update a data structure based on a plurality of parent data structures, where at least one of the plurality of parent data structures is associated with point data. Some embodiments may include reception of a notification to update from one of the plurality of parent data structures, determination that one or more of the plurality of parent data structures is updating, determination of whether a notification to update has been received from each of the one or more of the plurality of parent data structures, and, if the notification to update has been received from each of the one or more of the plurality of parent data structures, update of the data structure based on data of the one or more of the plurality of parent data structures.

27 Claims, 10 Drawing Sheets

U.S. PATENT DOCUMENTS

| | | |
|---|---|---|
| 6,122,664 A | 9/2000 | Boukobza et al. |
| 6,178,362 B1 | 1/2001 | Woolard et al. |
| 6,198,480 B1 | 3/2001 | Cotugno et al. |
| 6,223,182 B1 | 4/2001 | Agarwal et al. |
| 6,246,410 B1 | 6/2001 | Bergeron et al. |
| 6,247,020 B1 | 6/2001 | Minard |
| 6,262,729 B1 | 7/2001 | Marcos et al. |
| 6,263,339 B1 | 7/2001 | Hirsch |
| 6,282,697 B1 | 8/2001 | Fables et al. |
| 6,301,584 B1 | 10/2001 | Ranger |
| 6,307,546 B1 | 10/2001 | Wickham et al. |
| 6,336,138 B1 | 1/2002 | Caswell et al. |
| 6,381,605 B1 | 4/2002 | Kothuri et al. |
| 6,407,761 B1 | 6/2002 | Ching et al. |
| 6,429,882 B1 | 8/2002 | Abdelnur et al. |
| 6,430,565 B1 | 8/2002 | Berger et al. |
| 6,463,352 B1 | 10/2002 | Tadokoro et al. |
| 6,477,434 B1 | 11/2002 | Wewalaarachchi et al. |
| 6,480,836 B1 | 11/2002 | Colby et al. |
| 6,490,719 B1 | 12/2002 | Thomas |
| 6,505,205 B1 | 1/2003 | Kothuri et al. |
| 6,505,246 B1 | 1/2003 | Land et al. |
| 6,505,247 B1 | 1/2003 | Steger et al. |
| 6,543,046 B1 | 4/2003 | Lunt |
| 6,609,123 B1 | 8/2003 | Cazemier et al. |
| 6,643,555 B1 | 11/2003 | Eller et al. |
| 6,643,691 B2 | 11/2003 | Austin |
| 6,687,761 B1 | 2/2004 | Collins et al. |
| 6,700,590 B1 | 3/2004 | DeMesa et al. |
| 6,704,743 B1 * | 3/2004 | Martin .................. 707/103 R |
| 6,751,657 B1 | 6/2004 | Zothner |
| 6,842,774 B1 | 1/2005 | Piccioni |
| 6,952,705 B2 | 10/2005 | Knoblock et al. |
| 6,996,566 B1 | 2/2006 | George et al. |
| 7,069,514 B2 | 6/2006 | DeMesa et al. |
| 7,133,865 B1 | 11/2006 | Pedersen et al. |
| 7,275,024 B2 | 9/2007 | Yeh et al. |
| 7,478,128 B2 | 1/2009 | Helmstetter et al. |
| 7,523,111 B2 | 4/2009 | Walmsley |
| 7,689,579 B2 | 3/2010 | DeMesa et al. |
| 7,698,292 B2 | 4/2010 | DeMesa et al. |
| 7,814,123 B2 | 10/2010 | Nguyen et al. |
| 7,840,607 B2 | 11/2010 | Henigman et al. |
| 2001/0001851 A1 | 5/2001 | Piety et al. |
| 2001/0040591 A1 | 11/2001 | Abbott et al. |
| 2002/0099499 A1 | 7/2002 | Takayama et al. |
| 2002/0169867 A1 | 11/2002 | Mann et al. |
| 2002/0184610 A1 | 12/2002 | Chong et al. |
| 2002/0186248 A1 | 12/2002 | Ramanathan et al. |
| 2002/0198679 A1 | 12/2002 | Victor et al. |
| 2002/0198978 A1 | 12/2002 | Watkins |
| 2003/0020703 A1 | 1/2003 | Holub |
| 2003/0055832 A1 | 3/2003 | Roccaforte |
| 2003/0058277 A1 | 3/2003 | Bowman-Amuah |
| 2003/0105857 A1 | 6/2003 | Kamen et al. |
| 2003/0120627 A1 | 6/2003 | Emery et al. |
| 2003/0139968 A1 | 7/2003 | Ebert |
| 2003/0163329 A1 | 8/2003 | Bolene |
| 2004/0036716 A1 | 2/2004 | Jordahl |
| 2004/0059436 A1 * | 3/2004 | Anderson et al. .................. 700/2 |
| 2004/0117393 A1 | 6/2004 | DeMesa et al. |
| 2004/0162834 A1 * | 8/2004 | Aono et al. .................... 707/100 |
| 2004/0215626 A1 | 10/2004 | Colossi et al. |
| 2004/0220972 A1 | 11/2004 | Bhattacharjee et al. |
| 2004/0243281 A1 * | 12/2004 | Fujita et al. .................... 700/245 |
| 2005/0021622 A1 | 1/2005 | Cullen |
| 2005/0044097 A1 | 2/2005 | Singson et al. |
| 2005/0065910 A1 | 3/2005 | Welton et al. |
| 2005/0071749 A1 | 3/2005 | Goerke et al. |
| 2005/0143969 A1 | 6/2005 | DeMesa et al. |
| 2005/0144154 A1 | 6/2005 | DeMesa et al. |
| 2005/0172306 A1 | 8/2005 | Agarwal et al. |
| 2005/0182709 A1 | 8/2005 | Belcsak et al. |
| 2005/0216555 A1 | 9/2005 | English et al. |
| 2005/0228861 A1 | 10/2005 | Nagayama et al. |
| 2005/0234920 A1 | 10/2005 | Rhodes |
| 2005/0246627 A1 | 11/2005 | Sayed |
| 2005/0251571 A1 | 11/2005 | Karstens |
| 2005/0265162 A1 | 12/2005 | Tsubakihara |
| 2006/0031250 A1 | 2/2006 | Henigman et al. |
| 2006/0067334 A1 | 3/2006 | Ougarov et al. |
| 2006/0074505 A1 | 4/2006 | Kline |
| 2006/0116994 A1 | 6/2006 | Jonker et al. |
| 2006/0123019 A1 | 6/2006 | Nguyen et al. |
| 2006/0136583 A1 | 6/2006 | Helmstetter et al. |
| 2006/0161597 A1 | 7/2006 | Ougarov et al. |
| 2006/0187713 A1 | 8/2006 | Weetman |
| 2006/0200741 A1 | 9/2006 | DeMesa et al. |
| 2006/0218116 A1 | 9/2006 | O'Hearn et al. |
| 2006/0218131 A1 | 9/2006 | Brenes et al. |
| 2006/0294199 A1 | 12/2006 | Bertholf |
| 2007/0038889 A1 | 2/2007 | Wiggins et al. |
| 2007/0118599 A1 | 5/2007 | Castanho et al. |
| 2007/0124209 A1 | 5/2007 | Walker et al. |
| 2007/0208574 A1 | 9/2007 | Zheng et al. |
| 2007/0239741 A1 | 10/2007 | Jordahl |
| 2008/0103786 A1 | 5/2008 | Zhang et al. |
| 2010/0223296 A1 | 9/2010 | Angus et al. |

* cited by examiner

1405 — NON-POINT DATA / ATTRIBUTE TABLE
(TAG_TABLE)          1450 — POINT DATA TABLE

| NAME | ID | HLIMIT | LLIMIT | EUNIT | DESC |
|------|------|--------|--------|-------|------|
| P100 | 1001 | 300 | 100 | deg F | Pump operating temperature |
| P101 | 1002 | 200 | 0 | Pa | Pump pressure reading |
| P102 | 1003 | 1000 | 10 | rpm | Pump speed |
| C100 | 1004 | 10 | 0 | ft/s | Conveyor speed reading |
| C101 | 1005 |  |  |  | Conveyor operating status (on, off, standby, fault) |

| NAME | ID | VALUE |
|------|------|-------|
| P100 | 1001 | 200 |
| P101 | 1002 | 80 |
| P102 | 1003 | 260 |
| C100 | 1004 | 5.3 |
| C101 | 1005 | ON |

TAG VALUE CONNECTIONS — 1320

DATA QUERIES — 1315       1310 — TAG COLLECTION

TAG — 1305

| Member Name — 1482 | Member Type — 1484 |
|---|---|
| hiLimit | Real |
| lowLimit | Real |
| CurrentValue | Real |
| TagName | String |
| Units | String |
| Description | String |

Pump Associated TAG (Temperature)

TAG — 1305

| Member Name — 1482 | Member Type — 1484 |
|---|---|
| hiLimit | Real |
| lowLimit | Real |
| CurrentValue | Real |
| TagName | String |
| Units | String |
| Description | String |

Pump Associated TAG (Pressure)

TAG — 1305

| Member Name — 1482 | Member Type — 1484 |
|---|---|
| hiLimit | Real |
| lowLimit | Real |
| CurrentValue | Real |
| TagName | String |
| Units | String |
| Description | String |

Pump Associated TAG (Speed)

TAG — 1305

| Member Name — 1482 | Member Type — 1484 |
|---|---|
| hiLimit | Real |
| lowLimit | Real |
| CurrentValue | Real |
| TagName | String |
| Units | String |
| Description | String |

Conveyor Associated TAG (Speed)

TAG — 1305

| Member Name — 1482 | Member Type — 1484 |
|---|---|
| hiLimit | Real |
| lowLimit | Real |
| CurrentValue | Real |
| TagName | String |
| Units | String |
| Description | String |

Conveyor Associated TAG (Operational Status)

FIG. 9A

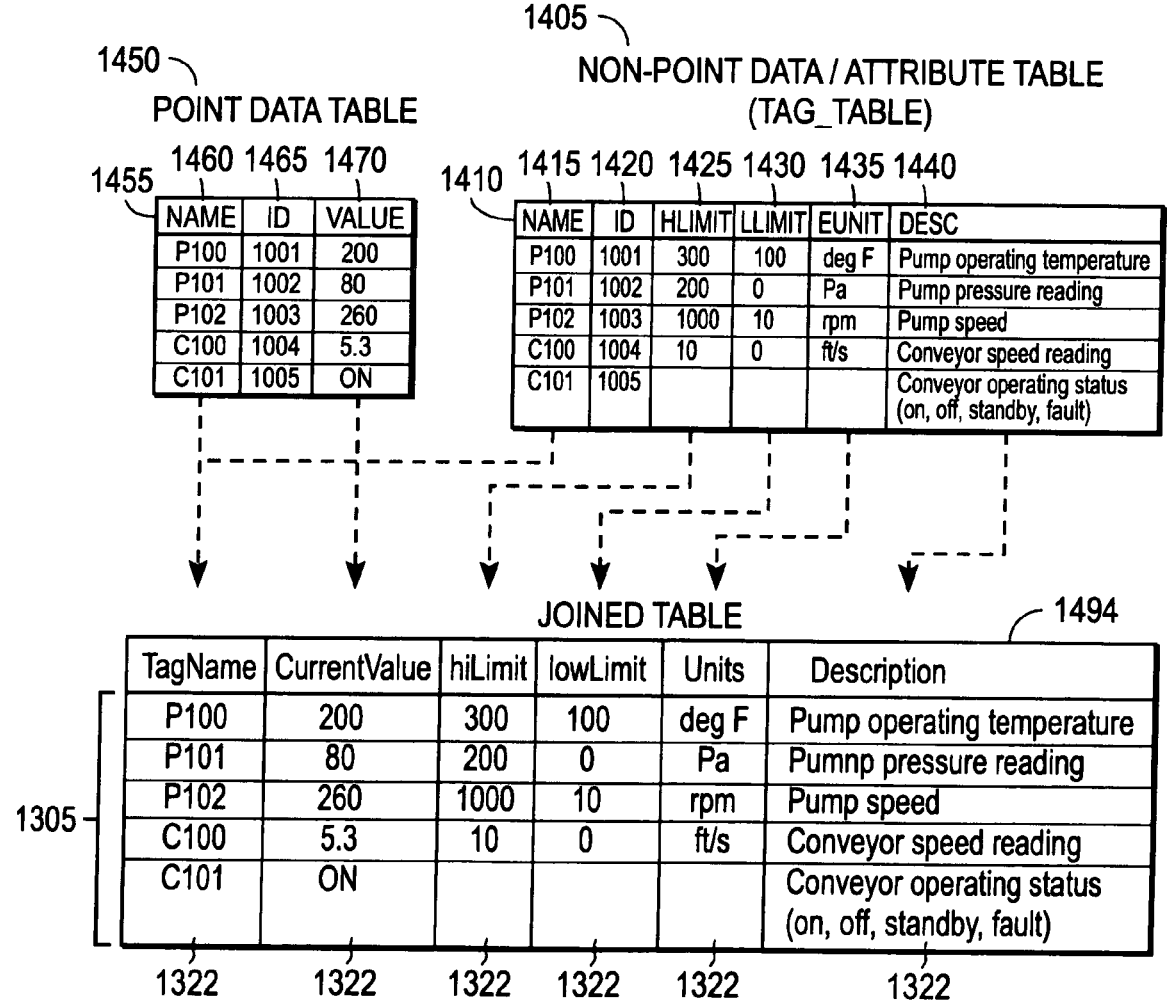

CHILD DATA STRUCTURE UPDATE IN DATA MANAGEMENT SYSTEM

BACKGROUND

1. Field

The embodiments described below relate generally to the management of data. More specifically, some embodiments concern the updating of a data structure based on updates to one or more other data structures.

2. Discussion

Modern industrial systems often rely to some extent on computer-based automation and monitoring. Examples of such systems include industrial automation systems, supervisory control and data acquisition (SCADA) systems, general data acquisition systems, and plant data historians. These systems may acquire, analyze and respond to data arising from the operation of a manufacturing plant.

The data may arise from independent sources, with each source configured to provide substantially "raw" or "native" information at pre-defined intervals and/or in near real-time. The information may consist of numerical values produced by gauges and/or monitors (e.g., speed, temperature, or pressure). Data of this type is often referred to as "point" data. On the other hand, "non-point" data includes information related to the point data, including but not limited to a description, limits, ranges, etc.

The point data and non-point data may be received from the independent sources and collected into data structures. These data structures, which may include tables, may provide access to the data collected therein that is more efficient than direct access of the sources. The data structures are preferably updated in response to changes to the collected data. The frequency of updating may be based on requirements of an application that accesses the collected data, the performance costs of updating the data structures, and other factors.

A child data structure may be associated with two or more of the data structures mentioned above. The child data structure collects data that is stored in each of the two or more "parent" data structures. Accessing the data collected in the child data structure may be more efficient than accessing the two or more parent data structures or directly accessing the sources of the data.

Conventionally, a child data structure is updated in response to the updating of any parent data structure that is associated with the child data structure. In some instances, an amount of time required to update the child data structure is greater than a poll cycle (i.e., an amount of time between updates) of one of the two or more parent data structures. Such a child data structure may therefore reside in a state of constant updating. Conventional systems for updating child data structures may also or alternatively present other inefficiencies.

SUMMARY

In order to address the foregoing, some embodiments concern a system, a method, an apparatus, a medium storing processor-executable process steps, and means to update a data structure based on a plurality of parent data structures, where at least one of the plurality of parent data structures is associated with point data. Such a system may include reception of a notification to update from one of the plurality of parent data structures, determination that one or more of the plurality of parent data structures is updating, determination of whether a notification to update has been received from each of the one or more of the plurality of parent data structures, and, if the notification to update has been received from each of the one or more of the plurality of parent data structures, update of the data structure based on data of the one or more of the plurality of parent data structures.

Some aspects include a first parent data structure, a second parent data structure, and a child data structure. The first parent data structure is associated with first point data and is to transmit a first notification to update in response to updating the first data. The second parent data structure is associated with second point data and is to transmit a second notification to update in response to updating the second data. The child data structure is associated with third point data and is to receive the first notification, to determine that the second parent structure is updating, to wait to update the third data until the second notification is received, to receive the second notification, and, in response to receipt of the second notification, to update the third data based on one or both of the first updated data and the second updated data.

The appended claims are not limited to the disclosed embodiments, however, as those in the art can readily adapt the teachings herein to create other embodiments and applications.

BRIEF DESCRIPTION OF THE DRAWINGS

The construction and usage of embodiments are set forth in the accompanying drawings, in which like reference numerals designate like parts, and wherein:

FIGS. 9A-9D illustrate examples of the organization of point data and non-point data according to some embodiments.

DETAILED DESCRIPTION

Figure 1:
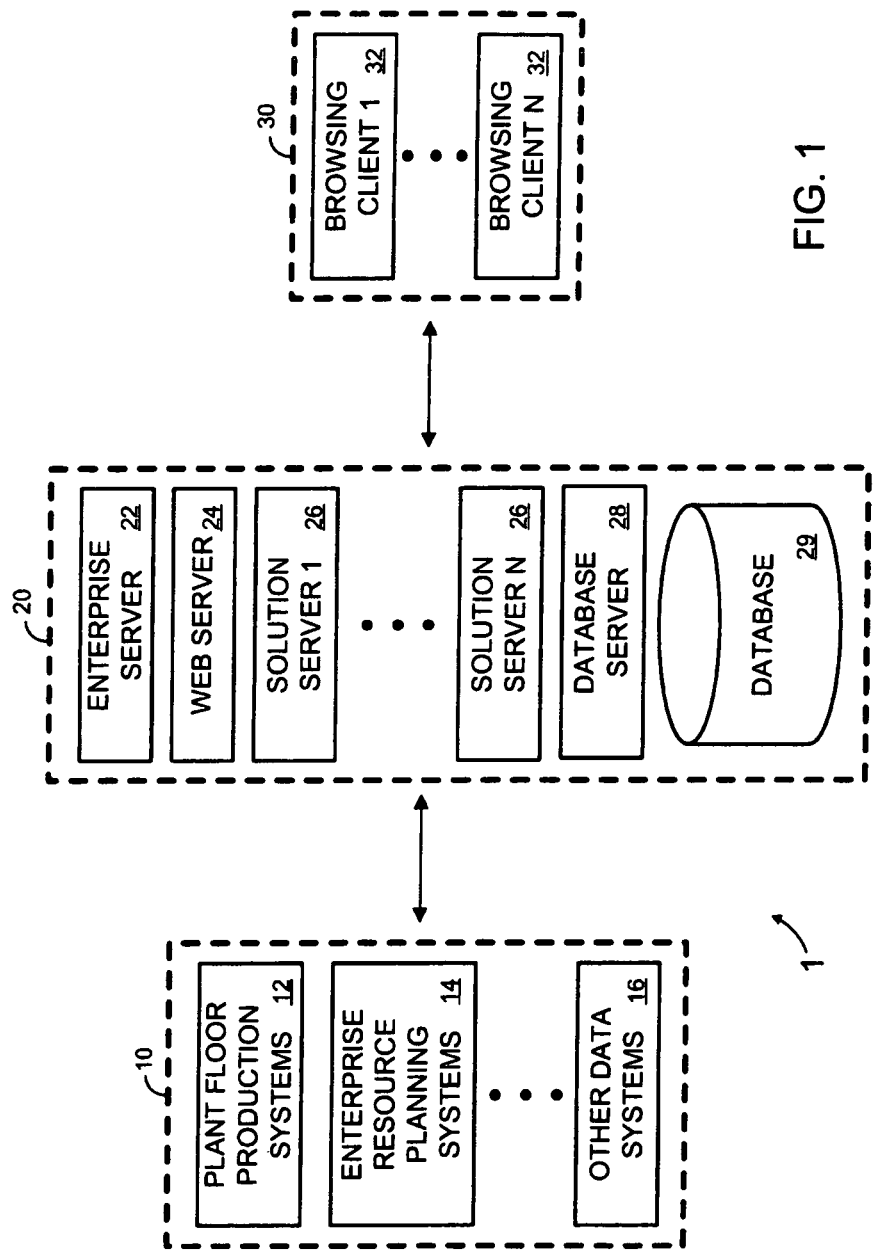
FIG. 1 is a block diagram of a system architecture according to some embodiments.

FIG. 1 illustrates an architecture of system 1 according to some embodiments. It should be noted that other architectures may be used in conjunction with other embodiments. System 1 includes back-end data environment 10 in communication with application environment 20. Browsing environment 30 is also in communication with application environment 20.

As used herein, systems "in communication" with one another are directly or indirectly capable of communicating over any number of different systems ports, interfaces, etc. for transferring data, including but not limited to a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more currently or hereafter-known transmission protocols, such as Asynchronous Transfer Mode (ATM), Internet Protocol (IP), Hypertext Transfer Protocol (HTTP) and Wireless Application Protocol (WAP).

Back-end data environment 10 comprises various data sources, such as plant floor production systems 12, enterprise resource planning data systems 14, and other data systems 16. Data arising from the back-end data environment 10 may comprise point data such as the aforementioned operational values and non-point data used to characterize, contextualize, or identify the point data and/or point data source. Each data source of back-end data environment 10 may comprise many disparate hardware and software systems, some of which may not be interoperable with one another.

Application environment 20 may issue queries for data to back-end data environment 10. In response, back-end data environment 10 acquires and transmits the data to application environment 20. Such communication may employ any system for querying and responding that is or becomes known. In some embodiments, back-end environment 10 pushes data to application environment 20 without requiring a corresponding query from application environment 20. The data may be pushed in response to an event detected by environment 10.

Application environment 20 may comprise enterprise server 22, Web server 24, one or more solution servers 26, database server 28 and database 29. Application environment 20 may comprise or be integrated as components of a single server device or multiple devices. In various embodiments, enterprise server 22 and solution servers 26 may comprise application programs developed, for example, using Java and/or C++ and running under, for example, operating systems such as the Windows™ family of operating systems.

Web server 24 manages data communication between application environment 20 and browsing environment 30. This data communication may include interaction with browsing environment 30 to receive queries for data stored in a cache data structure stored in database 29. According to some embodiments, browsing environment 30 may execute one or more Java applets to interact with Java servlets of Web server 24. Some embodiments use a client-server protocol that is not Web-based.

Solution servers 26 are used to access data from back-end environment 10. In some embodiments, solution servers 26 include solutions and connectors. A solution is an object instance that is associated with particular data of back-end environment 10. A connector comprises processor-executable process steps to populate such an object instance with the particular data. Solution servers 26 thereby allow application environment to access data that is acquired and stored by disparate systems of back-end environment 10. In some embodiments, one or more of solution servers 26 support Dynamic Data Exchange (DDE) protocol and Open Database Connectivity (ODBC) application programming interface for connecting to data sources of back-end environment 10. A solution server 26 may also or alternatively support the Java Database Connectivity (JDBC) application programming interface.

Database server 28 may comprise a front-end application that is usable to access and/or manage data stored in database 29. Such a front-end application may support Structured Query Language (SQL) commands or the like. Data may be stored in database 29 according to any currently- or hereafter-known protocol for storing data.

Database 29 may comprise base data structures and cache data structures according to some embodiments. The data structures may comprise tables, object instances, and/or any other structure for storing data that is or becomes known. The data structures may store or otherwise be associated with point data, non-point data or any other desired data. According to some embodiments, the data of database 29 is generated by and/or received from systems of back-end environment 10. These systems may include, but are not limited to plant floor production systems 12, enterprise resource planning data systems 14, industrial automation systems, SCADA systems, general data acquisition systems, and plant data historians.

The base data structures of database 29 may store data received by application environment 20 from one or more data sources of back-end environment 10. Specific data to be stored in a base data structure or a cache data structure may be defined by an administrator or other user of application environment 20. The cache data structures of database 29 may store data that is also stored in one or more of the base data structures of database 29. The duplication of data in a cache data structure may improve the efficiency with which the data is accessed. The improvement in efficiency may outweigh any reduction in efficiency attributable to maintaining the duplicative data.

In some embodiments, a solution server 26 operates to receive data from a data source of back-end environment 10. This operation may be in response to initialization of application environment 20 or timed polling of a base data structure associated with the data. The data may be received as a result of a change event that is generated by back-end environment 10 and that causes environment 10 to push the data to the solution server 26. Alternatively, the change event may cause the solution server 26 to poll for an incremental or full update.

Database server 28 may be used to update the base data structure with the received data, and to similarly update any other base data structure associated with the data. Cache data structures associated with the updated base data structures are then either updated or not updated in accordance with some embodiments.

For example, according to some embodiments, a cache data structure receives a notification to update from one of a plurality of parent data structures, determines that one or more of the plurality of parent data structures is updating, determines if a notification to update has been received from each of the one or more of the plurality of parent data structures, and, if the notification to update has been received from each of the one or more of the plurality of parent data structures, updates itself based on data of the one or more of the plurality of parent data structures.

Some embodiments include a first parent data structure, a second parent data structure, and a child data structure. The first parent data structure is associated with first point data and is to transmit a first notification to update in response to updating the first data. The second parent data structure is associated with second point data and is to transmit a second notification to update in response to updating the second data. The child data structure is associated with third point data and is to receive the first notification, to determine that the second parent data structure is updating, and to wait to update the third data until the second notification is received, to receive the second notification, and, in response to receipt of the second notification, to update the third data based on one or both of the first updated data and the second updated data. Some examples of each of the foregoing embodiments will be described in detail below.

Returning to FIG. 1, browsing environment 30 comprises one or more browsing clients 32. Each browsing client 32 may comprise processor-executable process steps executed by a respective user device. A browsing client 32 may provide an interface to view data stored in one or more cache data structures of database 29. A browsing client 32 may comprise a communication application such as a Web browser or a Java applet. As such, a browsing client 32 may be connected to application environment 20 through the Internet or through an Intranet. A browsing client 32 may comprise any other suitable software application according to some embodiments. Browsing clients 32 may be executed by any suitable user device, including but not limited to, a desktop computer, a laptop computer, a computer terminal, a personal digital assistant, a telephone, and a tablet computer.

The environments of FIG. 1 may be connected differently than as shown, and each block shown may be implemented by one or more hardware and software elements. The various hardware and software elements of one or more blocks may be located remotely from each other or integrated together. Some embodiments may include environments, systems, servers, and clients that are different from those shown.

Figure 2:
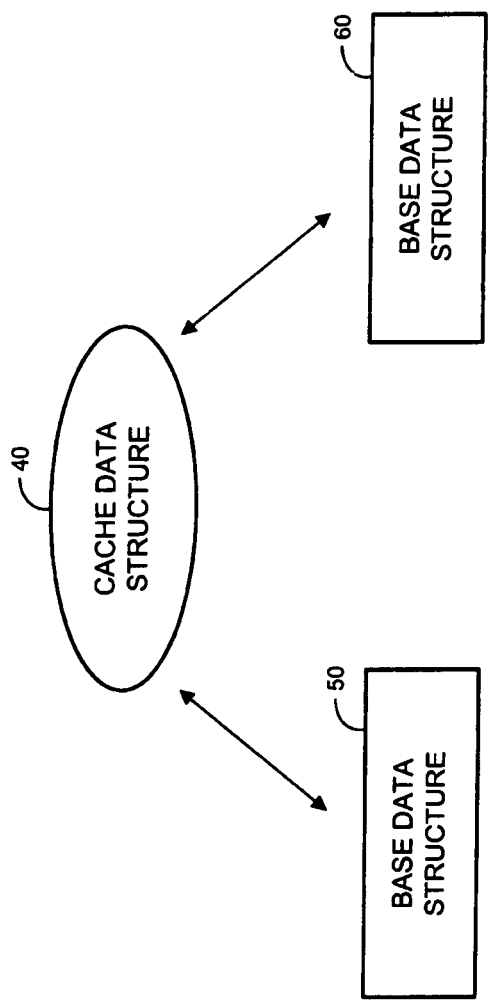
FIG. 2 is a block diagram illustrating relationships between a cache data structure and base data structures according to some embodiments.

FIG. 2 is a conceptual block diagram illustrating relationships between data structures according to some embodiments. As shown, cache data structure 40 is based on base data structure 50 and base data structure 60. Data of data structures 40, 50 and 60 may reside in database 29 according to some embodiments. Also, in some embodiments, base data structure 50 and base data structure 60 may store some or no common data. One or both of base data structures 50 and 60 may store point data generated by and received from back-end environment 10.

Data structures 40 through 60 may comprise tables, flat databases, relational databases, object instances, or any other suitable data structure. According to some embodiments, base data structure 50 and base data structure 60 are instances of a base data structure object. The base data structure object may define states, methods, variables and other objects (e.g. a cache data structure object instance) related to a base data structure. In this case, base data structure 50 and base data structure 60 are run-time usages of the base data structure object. Generally, a run-time usage of an object is referred to as an object instance. Different instances of the same object can be associated with different data.

Cache data structure 40 may comprise an instance of a cache data structure object. The cache data structure object may define states, methods, variables and other objects (e.g. base data structure object instances) related to a cache data structure. The use of objects may provide reusability, consistency, inheritance and other benefits known to those familiar with object-oriented techniques.

Figure 3:
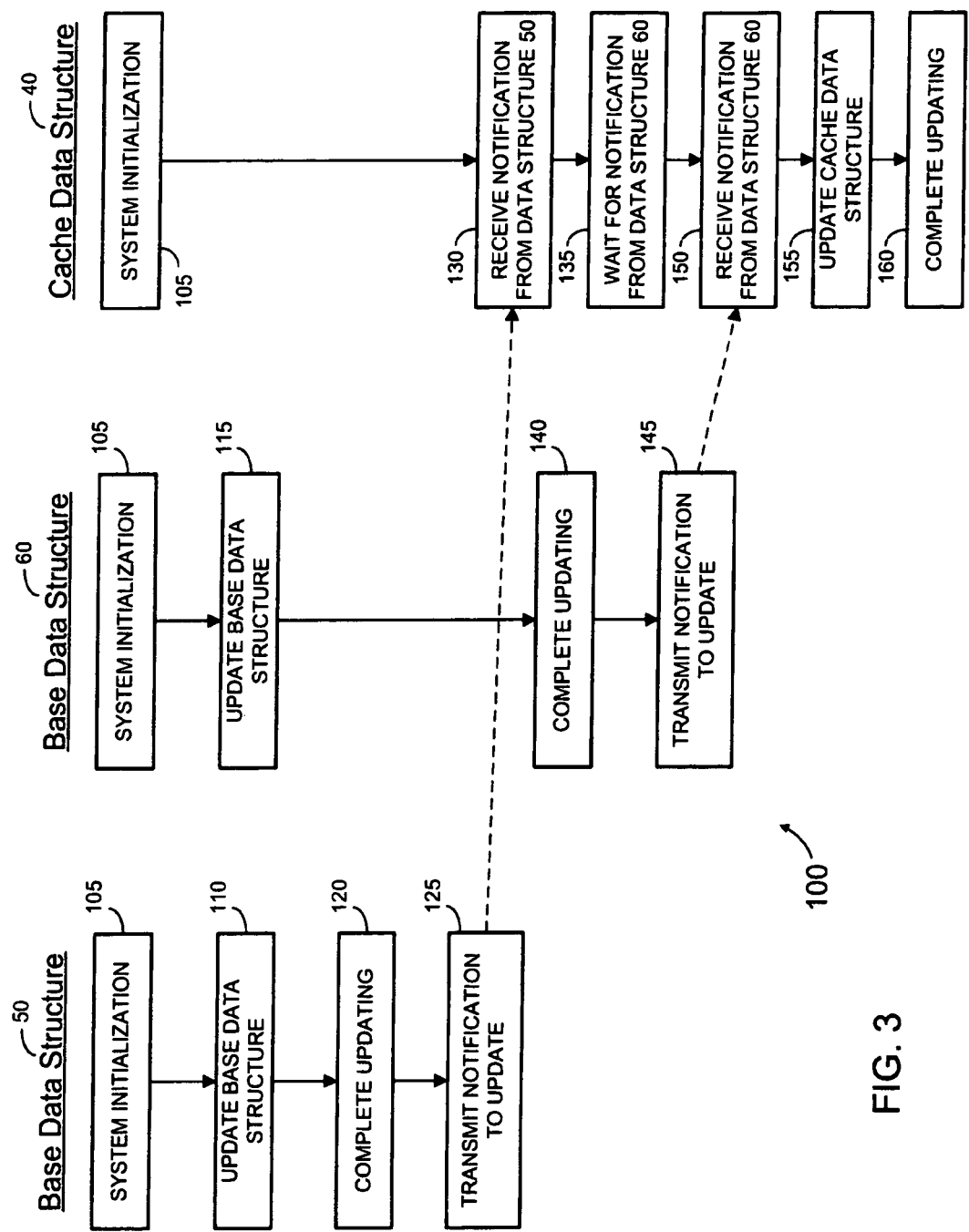
FIG. 3 is a flow diagram of processes to update data structures according to some embodiments.

FIG. 3 illustrates process steps 100 to update a cache data structure according to some embodiments. All process steps mentioned herein will be described as if embodied in and executed by application environment 20. Process steps 100 may be embodied in one or more software or hardware elements and executed, in whole or in part, by any device or by any number of devices in combination, including a server device embodying enterprise server 22. Moreover, some or all process steps may be performed manually.

In some embodiments, process steps 100 may be executed to provide a first base data structure, a second base data structure, and a third base data structure. The first base data structure may be associated with first data and to transmit a first notification to update in response to updating the first data. The second base data structure may be associated with second data and to transmit a second notification to update in response to updating the second data. The cache data structure may be associated with third data and to receive the first notification, to determine that the second base structure is updating, to wait to update the third data until the second notification is received, to receive the second notification, and, in response to receipt of the second notification, to update the third data based on one or both of the first updated data and the second updated data.

System 1 is initialized at 105 of process 100. According to some embodiments, initialization includes instantiating objects corresponding to pre-defined data structures 40, 50 and 60. Initialization may comprise any other suitable procedures for initializing system 1.

Data of base data structure 50 is updated in response to initialization at 110. In some embodiments, a suitable one or more solution servers 26 retrieves data for base data structure 50 at 110 from the data sources of back-end environment 10 that provide the data associated with base data structure 50.

Data of base data structure 60 may be similarly updated at 115. The updates at 110 and 115 may occur in parallel, and/or either update may begin first.

According to the present example, the updating of base data structure 50 completes at 120. A notification of the completed update is then transmitted to cache data structure 40 at 125. Transmission of the notification may comprise changing a flag associated with base data structure 50 from "update pending" to "update complete". In some embodiments, base data structure 50 transmits the notification by calling a method exposed by the object instance of cache data structure 40. Enterprise server 22 may manage transmission of the notification by detecting the changed flag and by calling the method exposed by cache data structure 40 and/or changing an appropriate flag or variable of cache data structure 40 that indicates the completed updating of base data structure 50.

In this regard, cache data structure 40 receives the notification at 130. Cache data structure 40 does not update itself at this point, but, rather, waits at 135 to receive a notification to update from base data structure 60, on which structure 40 is also based. According to some embodiments, cache data structure 40 determines, after 130, that base data structure 60 is currently updating, and waits at 135 in response to the determination.

The updating of base data structure 60 then completes at 140. A notification of the completed update is transmitted to cache data structure 40 at 145. Transmission of the notification may comprise any of the processes described above with respect to 125, or any other one or more suitable processes. The notification is received by cache data structure 40 at 150.

Cache data structure 40 is updated at 155 in response to receiving the notifications at 130 and 150. Updating cache data structure 40 may comprise replacing any data of cache data structure 40 with corresponding data from base data structures 50 and/or 60 that has changed since a last update of cache data structure 40. In some embodiments, all of the data associated with cache data structure 40 is refreshed with corresponding data of base data structures 50 and 60 at 155. The updating of cache data structure 40 completes at 160.

According to some embodiments, cache data structure 40 transmits a notification to update to a child data structure of cache data structure 40 after 160. A child data structure is any data structure that is based on another data structure. For example, cache data structure 40 of FIG. 2 is a child data structure of base data structure 50 and of base data structure 60. In this regard, base data structure 50 and base data structure 60 are each parent data structures of cache data structure

40. Cache data structure 40 is also a parent data structure of the child data structure mentioned above.

Figure 4:
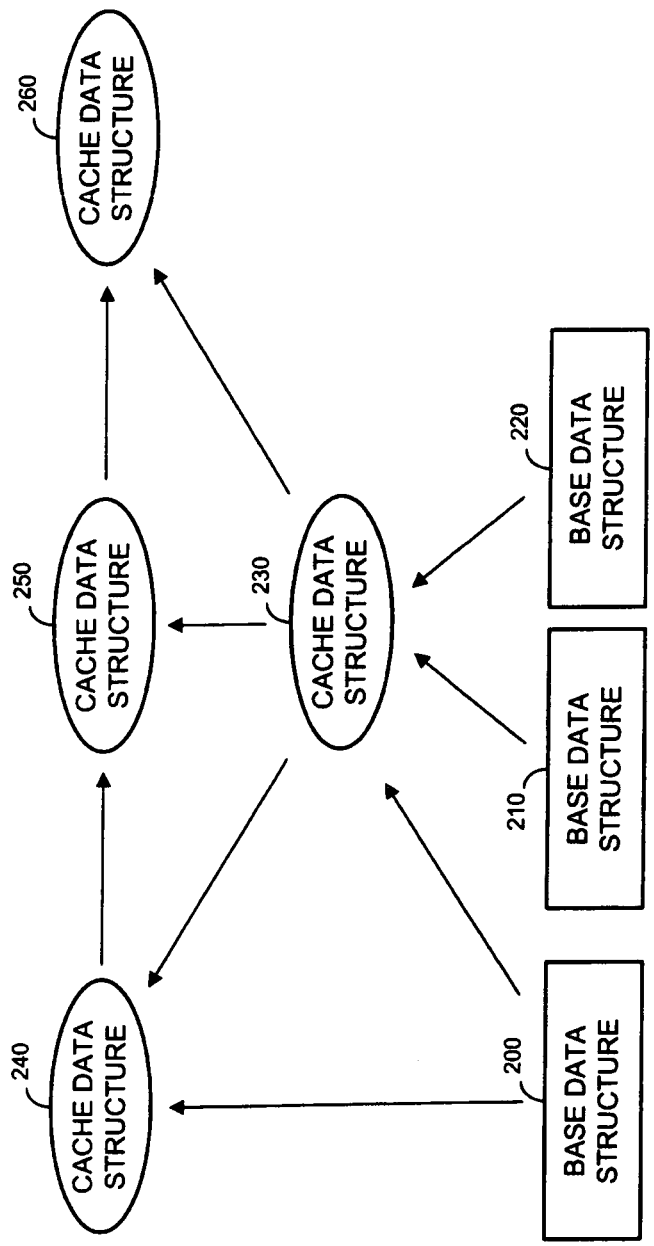
FIG. 4 is a block diagram illustrating relationships between cache data structures and base data structures according to some embodiments.

FIG. 4 is a conceptual block diagram illustrating relationships between data structures according to some embodiments. As shown, base data structure 200, base data structure 210, and base data structure 220 are parent data structures of cache data structure 230. Cache data structure 240 is, in turn, a child data structure of base data structure 200 and of cache data structure 230. Cache data structure 250 is a child data structure of cache data structure 240 and cache data structure 230, and is a parent data structure of cache data structure 260. Cache data structure 260 is also a child data structure of data structure 230. Each child data-structure is associated with some or all of the data that is associated with each of its parent data structures. Data structures 200 through 260 may reside in database 29 according to some embodiments.

Figure 5:
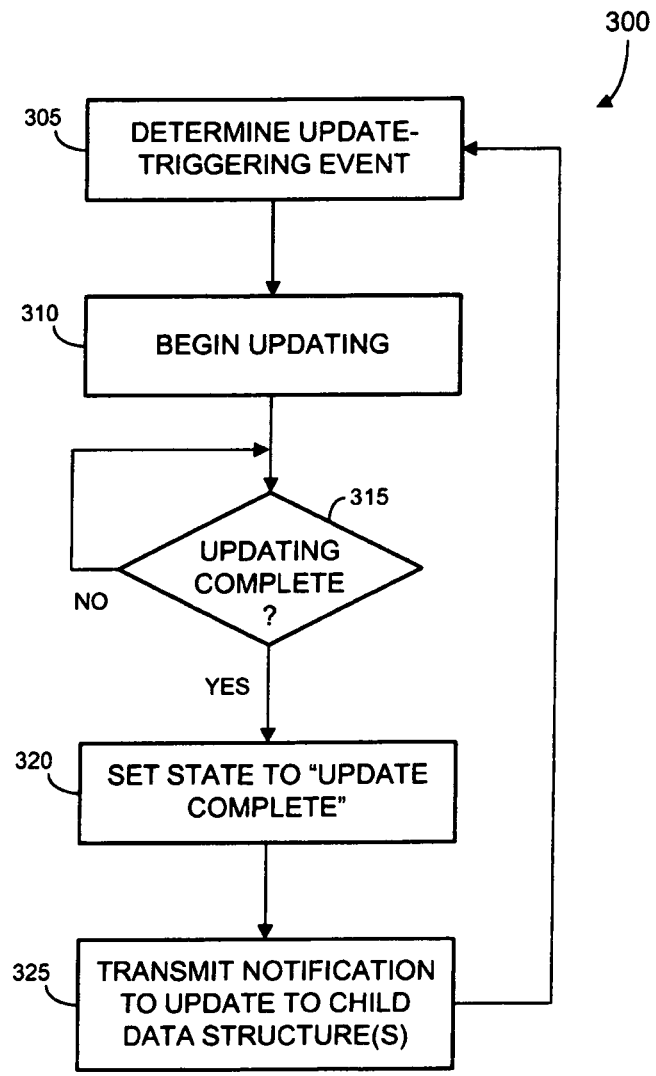
FIG. 5 is a flow diagram of a process to update a base data structure according to some embodiments.

FIG. 5 illustrates process steps 300 of a base data structure according to some embodiments. Process steps 300 may be performed with respect to base data structures 200 through 220 of FIG. 4. Process steps 300 may be executed by either of base data structures 50 or 60 to implement some embodiments of process steps 100 of FIG. 2.

Initially, at 305, an update-triggering event is determined. According to some embodiments, initialization of system 1 or a poll of a base data structure will trigger updating of the base data structure. Each base data structure of FIG. 4, for example, may be associated with a unique poll cycle. The poll cycles of two or more base data structures may be identical. A poll cycle associated with a base data structure may be determined based on one or more of a size of the base data structure, a type of data associated with the base data structure, and other factors.

An update-triggering event may be determined at 305 in response to an event detected by a system of back-end environment 10. The system may push data to an appropriate one or more of solution servers 26 after detecting the event. Alternatively, the system may notify the appropriate one or more solution servers 26 of the event and the one or more solution servers 26 may respond by polling for a full or incremental update. The determination of the event at 305 may comprise the above-described receipt of the data by the one or more solution servers 26.

Updating of the base data structure begins at 310. One or more solution servers 26 may retrieve data associated with the base data structure at 310 from appropriate data sources of back-end environment 10. In some embodiments, the one or more solution servers 26 determine the initialization or poll at 305 and begin updating the base data structure at 310 based on the determination. Flow then proceeds to and pauses at 315 until it is determined that the updating is complete.

Once it is determined that the updating is complete, a state of the base data structure is set to "update complete" at 320. Setting the state may comprise changing a flag associated with the base data structure to "update complete". Any other currently- or hereafter-known system to set the state of a base data structure to "update complete" may be used in some embodiments of 320. A notification to update is then transmitted to all child data structures of the base data structure at 325.

In a case that process steps 300 are being performed with respect to base data structure 200, the notification is transmitted to cache data structures 230 and 240. Transmission of the notification may comprise calling a method exposed by each child data structure. Enterprise server 22 may manage transmission of the notification by detecting the changed state and by 1) calling the method exposed by the child data structures and/or 2) changing an appropriate flag or variable of the child data structures that indicates the completed updating of the base data structure. Flow returns to 305 after 325 to await a next poll.

As mentioned above, one or more solution servers 26 may determine the update-triggering event at 305 and begin updating the base data structure at 310. In some embodiments, the one or more solution servers 26 (or any other software and/or hardware entity) determine if the data associated with the base data structure has changed prior to beginning the updating at 310. To perform this determination, the one or more solution servers 26 (or other entity) may access a "pre-cache" of the data associated with the base data structure and may compare incoming data from environment 10 with the pre-cache data. If the data has not changed, flow returns to 305 to await a next poll.

The foregoing feature may be implemented only for base data structures having a size below a certain threshold. Accordingly, a size of the base data structure may be checked before determining whether to update the base data structure in response to an update-triggering event.

Figure 6:
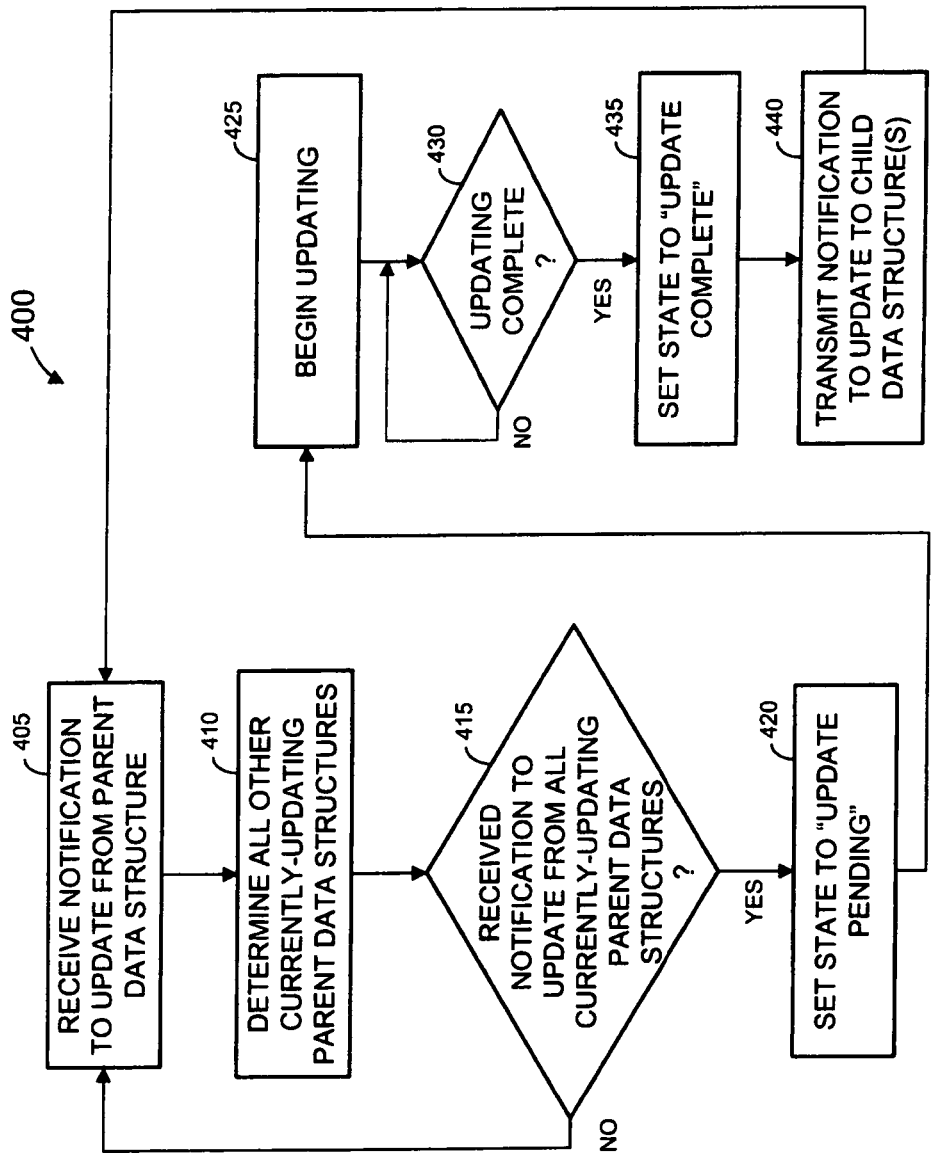
FIG. 6 is a flow diagram of a process to update a cache data structure according to some embodiments.

FIG. 6 illustrates process steps 400 of a child data structure according to some embodiments. Process steps 400 may be executed by any of cache data structures 230 through 260 of FIG. 4. Cache data structure 40 of FIG. 2 may also execute process steps 400 to implement some embodiments of process steps 100 of FIG. 2.

Briefly, process steps 400 may provide reception of a notification to update from one of the plurality of parent data structures, determination that one or more of the plurality of parent data structures is updating, determination of whether a notification to update has been received from each of the one or more of the plurality of parent data structures, and, if the notification to update has been received from each of the one or more of the plurality of parent data structures, update of the data structure based on data of the one or more of the plurality of parent data structures.

At 405, a notification to update is received from a parent data structure. The notification may comprise a call to a method exposed by the child data structure, a determination, based on a flag, state or other indicator, that an update of the parent data structure is complete, a change to a variable associated with the child data structure, or other type of notification. Next, all other currently-updating parent data structures are determined at 410.

Determination of the currently-updating parent data structures may be based on a flag, state or other indication that other parent data structures are currently updating. For example, the child data structure may call a method of each parent data structure that returns an indication of whether the parent data structure is currently updating. In other examples, each parent data structure calls a method of the child data structure to indicates an update status of the parent data structure.

Next, at 415, it is determined whether a notification to update has been received from the currently-updating parent data structures that were determined at 410. For example, it will be assumed that cache data structure 240 received the notification from base data structure 200 at 405, and that cache data structure 230 was determined to be updating at 410. The determination at 415 is initially negative because a notification to update has not been received from cache data structure 230. Flow therefore returns to 405 to await the notification from cache data structure 230.

Once the notification is received from cache data structure 230, it is again determined at 410 whether any other parent data structures are currently updating. If not, flow proceeds from 415 to 420.

A state of the child data structure is set to "update pending" at 420. Setting the state may comprise changing a flag associated with the child data structure to "update pending". Any other currently- or hereafter-known system to set the state of a child data structure to "update pending" may be used in some embodiments of 420. At 425, the child data structure begins updating with some or all of the data associated with each parent data structure of the child data structure. Flow pauses at 430 until it is determined that the updating is complete.

Once it is determined that the updating is complete, a state of the child data structure is set to "update complete" at 435. A notification to update is then transmitted to all child data structures of the child data structure at 440. The notification may comprise any type of suitable notification, including but not limited to those mentioned herein. Continuing with the above example, the notification may be transmitted to cache data structure 250 at 440. Flow returns to 405 after 440 to await a next notification from a parent data structure.

In general, point data is subject to dynamic change and is monitored, and reported through various operations and functions associated with processing the point data obtained from selected sources. In industrial automation and control systems, decision support and reporting capabilities may be provided based on Point data may be monitored over very short timeframes ranging in the sub-second to sub-minute range.

Non-point data relates to a broad category of context-providing information associated with point data that, in one sense, extend the functionality and meaning of the point data. Non-point data may include descriptive and/or attribute information characterizing the point data, as well as, other information such as limits, ranges, etc. Non-point data may originate from numerous sources and relate to disparate aspects of an enterprise environment. For example, non-point data may comprise data associated with conventional database applications/environments and include transactional information, production data, business data, etc. In conventional systems, integral and flexible manipulation of point data and non-point data is restricted due to their inherent differences and properties.

The dynamic properties of point data give rise to time critical retrieval restrictions on systems designed to acquire and evaluate point data. Rapidly changing point data is generally acquired or refreshed at a high frequency (e.g. short retrieval time interval) to insure that the information is up-to-date. Other point data and non-point data information may be more static in nature and not require a similar short acquisition interval.

As will be described in greater detail below, certain aspects of the methods for data management provide formulations for data structures used to store and manipulate both point data and non-point data in a cohesive manner. point data may be characterized as current, real-time, or value data often associated with one or more instruments, components, or portions of a manufacturing, industrial, commercial, or other system. Any of these apparatuses may be configured to generate, measure, and/or sample data that relates to one or more point data sources of interest. For example, a data acquisition system for a particular instrument or machine may continuously or periodically acquire data reflecting a motor's operating speed and/or operating temperature as point data from a point data source associated with the motor. In certain instances, the point data may be a simple numerical or string value. Point data may further be associated with monitoring, control, and reporting functions of various instruments, components, and applications to provide information relating to the operation of a selected system. This information may also be made available for collection and review by various data acquisition and control systems.

Point data is often acquired in a raw or unstructured form wherein the point data reflects a numerical or string value without supporting details, description, and/or attributes. As previously described, certain types of point data may be associated with real-time or near real-time information (e.g. current temperature, pressure, speed, voltage, current, etc.) that may be desirably sampled, updated or refreshed relatively frequently. The exact frequency of these operations is typically dependent on the characteristics of the point data itself and may be different across the multiple point data sources incorporated into a particular system. Providing a mechanism to allow for customization of the acquisition strategy for various classes of point data becomes increasingly significant as the size or complexity of the system grows to reduce unnecessary queries, data calls and computational load.

The context in which point data is to be interpreted may be readily lost or confused. To give point data context it may therefore be desirable to associate certain non-point data with the point data. Non-point data may take many forms, including but not limited to, attribute information, parameters, limits and other descriptive information. As used herein, the terms point data and non-point data encompass various categories of information which are not necessarily constrained to the examples described herein. As such, the various embodiments of the invention may be applied to a variety of different contexts embodied in the combination and use of point data and non-point data.

Other useful non-point data may include information such as maintenance work orders (relational data or API (Application Programming Interface) structure data from maintenance systems), equipment documentation (unstructured data usually contained within operating system files and documents), and information such as URL (Uniform Resource Locator) links to supplier web sites. These types of non-point data may be associated with non-tag based information contained, for example, within Oracle® or SAP ® databases/environments. Non-point data therefore represents a broad class of information that may be associated with point data providing a contextual and informational basis.

Figure 7:
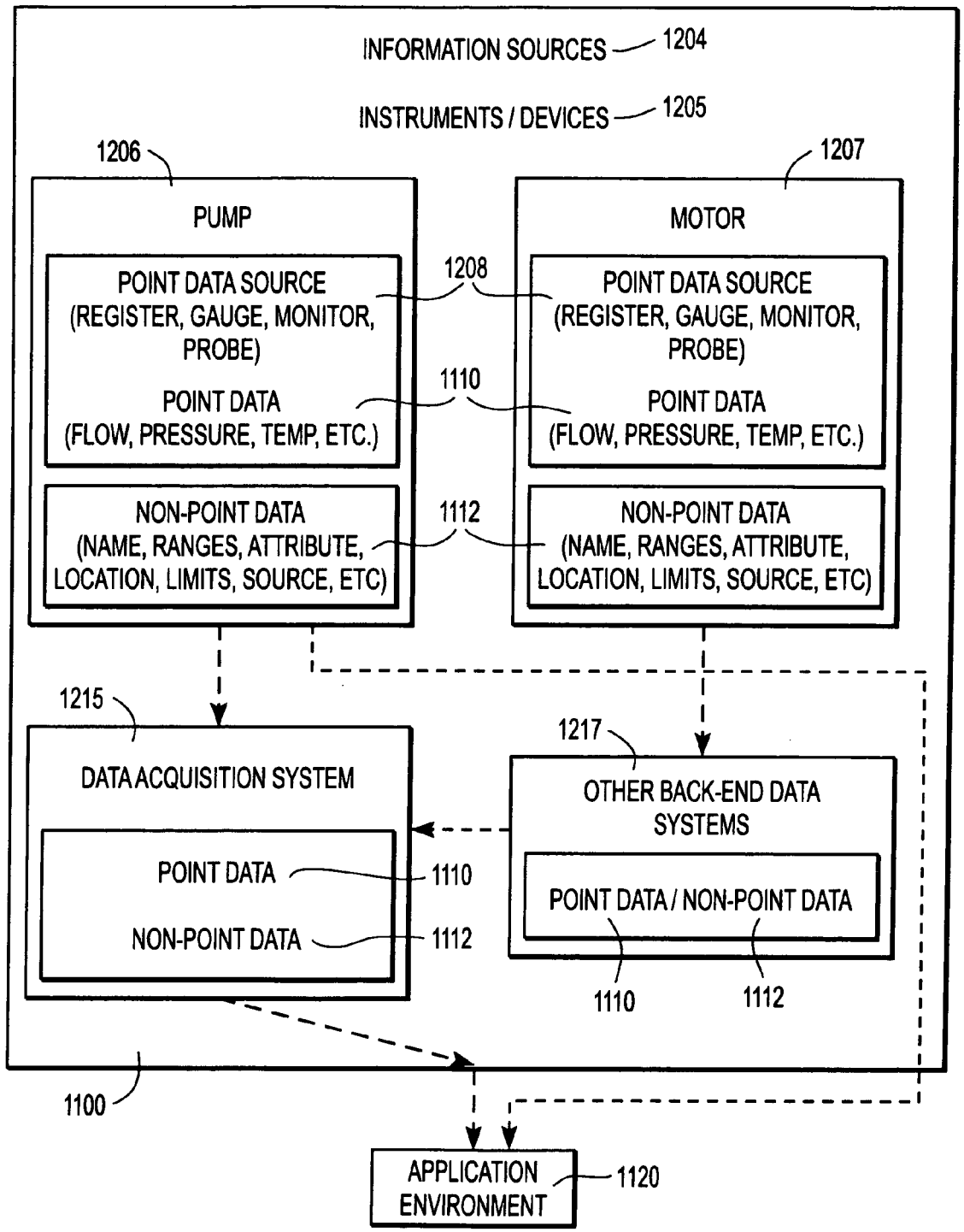
FIG. 7 illustrates an exemplary system having a plurality of instruments or devices each with one or more associated point data sources.

FIG. 7 illustrates a block diagram of an exemplary mechanism for association of point data 1110 to non-point data 1112. In one aspect, the information may arise from a plurality of informational sources 1204 shown by way of example as instruments or devices 1205 including an exemplary pump 206 and exemplary motor 1207. The informational sources 1204 may further comprise point data sources 1208 associated with a particular instrument or device 1205 including for example; registers, gauges, monitors, or probes from which point data 1110 may be generated and subsequently fetched or acquired. Non-point data 1112 may also be associated with each informational source 1204 including for example; names, ranges, attributes, locations, limits, sources, among other information. Certain non-point data 1112 may be provided by a selected informational source 1204 in connection with the point data 1110, or alternatively, the non-point data 1112 may be subsequently associated with the point data 1110 as will be described in greater detail below.

In one aspect, point data sources 1208 correspond to addressable points of the informational sources 1204 and may be referred to as a Tag. A Tag comprises a collection of desired point data 1110 and non-point data 1112 utilized or processed by the application environment 1120. Each Tag may further reflect a data structure used for storing point data 1110 and/or non-point data 1112 acted upon by the application environment 1120. It will be appreciated that "point data" and "Tags" reflect terms used in various processing and manufacturing industries to define sources of uniquely identifiable values for various instrument and apparatus functionalities and features but may also be applied in other contexts and systems.

Each point data source 1208 may be associated with a measurable or monitorable feature from which point data 1110 may be requested and collected. For a given instrument or device 1205, a plurality of such point data sources may exist with the point data 1110 generated by, or associated with, each point data source 1208 subject to relatively frequent change and generally representative of a current state or operational condition of that point data source 1208. Point data 1110 may further be acquired either directly or indirectly by components of the application environment 1120 and associated with non-point data 1112 which is recognized by the components of the application environment 1120. In various embodiments, association of certain non-point data 1112 with the point data 1110 may be accomplished by the instrument 1205 or alternatively non-point data 1112 associations may be performed by other components of the system. In various instances, association of point data 1110 with non-point data 1112 may occur substantially transparently to the point data sources 1208 and/or various associated back-end data systems.

In general, non-point data 1112 is associated with point data 1110 and reflected in the Tag data structure. Together this information may be used by the application environment 1120 for the purposes of monitoring, control, and analysis and to assess the state or condition of selected instruments or systems within the back-end data environment 1100.

Point data 1110 and non-point data 1112 may be received by a data acquisition system 1215 configured to collect information from various point data sources 1208 or other back-end data systems 1217 associated with corresponding point data sources 1208. In various embodiments, the data acquisition system 1215 and back-end data systems 1217 typically provide only limited functionality in terms of data acquisition and management but may serve as a source of point data 1110 and non-point data 1112 for the application environment 1120. Alternatively, the application environment 1120 may be configured to acquire point data 1110 and non-point data 1112 directly from the various back-end data systems 1217 and point data sources 1208. In such instances, the application environment 1120 is capable of interacting with the various components of the back-end data environment 1100, systems 1215, 1217 and/or point data sources 1208 to collect information about each desired point data source 1208 and associated non-point data 1112.

As previously described, point data 1110 may originate from many point data sources with each having differing volatility or longevity characteristics. In one aspect, these characteristics describe how dynamic the point data 1110 is expected to be wherein certain point data may be characterized as relatively static or infrequently changing and other point data may be characterized as relatively dynamic or more frequently changing. Thus, the point data 1110 acquired from the systems 1215, 1217 or point data sources 1208 may posses a wide range of temporal qualities ranging from substantially never changing to changing substantially every instant. One feature of the data acquisition and management system of the various embodiments of the invention is that it provides a mechanism for conveniently associating with each point data source 1208, a configurable data fetch or acquisition frequency such that the application environment 1120 can be configured to obtain, refresh, or update the point data 1110 as needed or desired.

In various embodiments, the point data 1110 may comprise a wide variety of different constructions of data. For example, the point data 1110 may relate to real-time operational data for an informational source 1204 or back-end data system 1215, 1217 including temperature, pressure, speed, etc. In certain instances, the point data 1110 may be a primitive value not carrying with it a description of the point data source 1208 from which it was obtained. In other instances the point data 1110 may be associated with non-point data 1112 including attribute information which characterizes the point data source 1208 (e.g. instrument name) or point data 1110 itself (e.g. data units). Certain non-point data or attributes 1112 may be further defined for the point data sources 1208. These may include for example, operational ranges, point data source names or associations, and other information. The non-point data or attribute information 1112 may be assigned by the data acquisition systems 1215, 1217 used to acquire the point data 1110 or may be assigned directly by components of the application environment 1120. In various embodiments, non-point data or attribute information 1112 reflects more static information than point data 1110 and typically does not change at the same frequency as the point data 1110 itself. As a result of the more static character of this information the acquisition rate or fetch frequency may be desirably adjusted to be correspondingly lower.

In one aspect, a component builder 1226 and solution builder 1227 may be associated with the application environment 1120. The component builder 1226 provides functionality for defining, generating, managing, and visualizing various component data structures used for point and non-point data acquisition/integration in accordance with various embodiments of the invention. The solution builder 1227 provides functionality for creating views or visualizations of components generated with the component builder 1226.

In one aspect, the component builder 1226 and solution builder 1227 allow point and non-point data 1110, 1112 to be flexibly organized and presented using a graphically driven approach. In such an approach, a user is able to create one or more components and views in an iconically and menu-driven manner. Furthermore, these builders 1226, 1227 may utilize intuitive and semi-automated mechanisms for point data and non-point data integration which facilitates design and manipulation of the data 1110, 1112 at small and large scales alike. While depicted as being associated with the application environment 1120, it will be appreciated that the component builder 1226 and solution builder 1227 may be integrated with various components of the system 1100 such as the development environment 1128.

Figure 8:
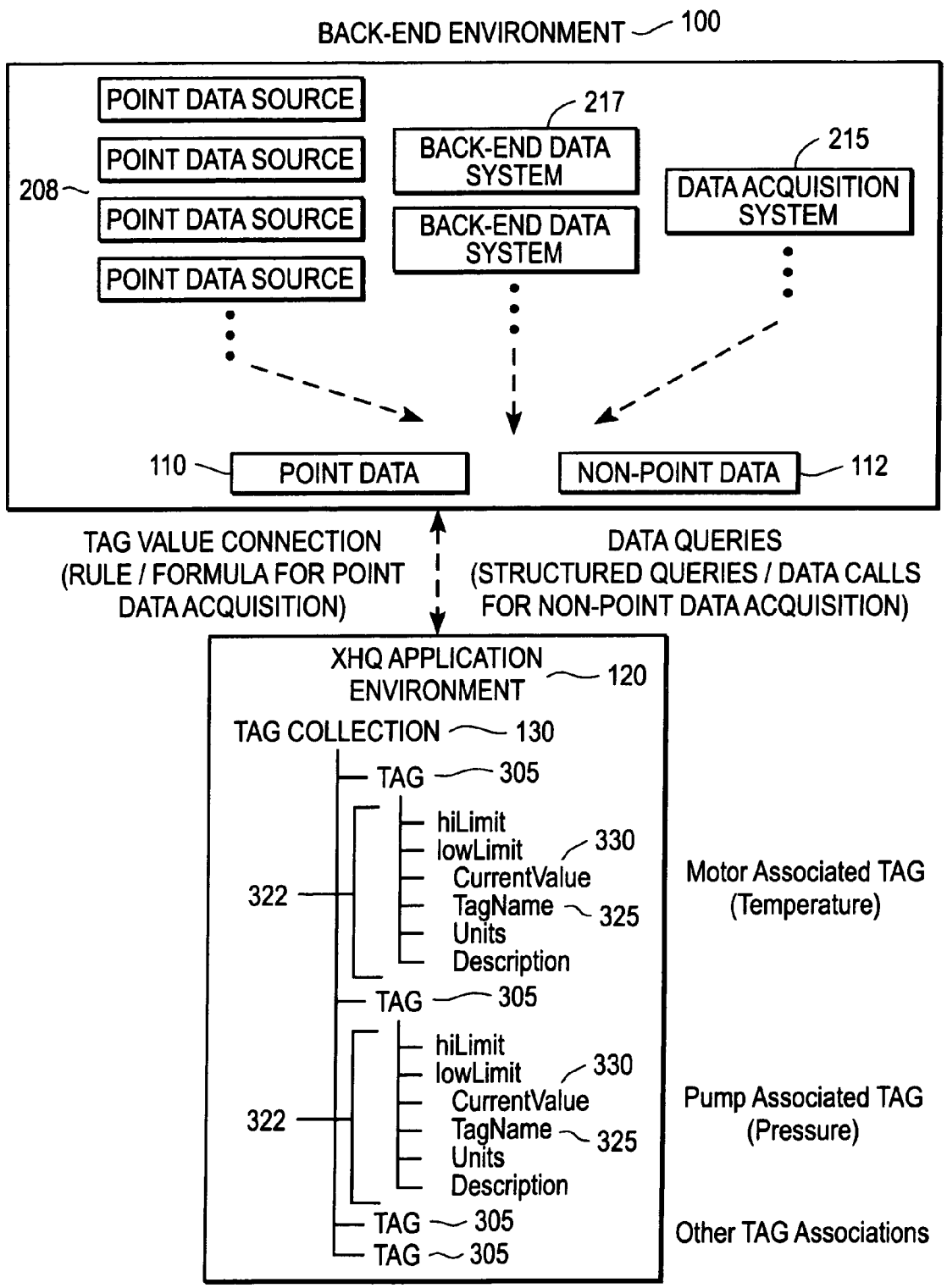
FIG. 8 illustrates an overview of the relationship between point data and non-point data associated with back-end sources utilized by an application environment.

FIG. 8 further illustrates an overview of the relationship between point data 1110 and non-point data 1112 associated with the back-end environment 1100 and the tag representation and collections utilized by the application environment 1120. In one aspect, point data 1110 and non-point data 1112 obtained from selected point data sources 1208, back-end data systems 1217, data acquisition systems 1215, and/or application environment 1120 may be stored in one or more Tags 1305 organized as a Tag collection 1310. Each Tag collection 1310 represents a grouping of Tags 1305 that are logically associated and representative of a data solution corresponding to some or substantially all of the desired point data 1110 and non-point data 1112 for a particular instrument, apparatus, system, view, etc. This is exemplified in FIG. 8 as a motor-associated temperature Tag, a pump-associated pressure Tag, and additional unspecified Tags. In various embodiments, each data solution may be visualized as a hierarchical ordering or data structure capable of being displayed and navigated in a visually intuitive manner. As will be described in greater detail below, this manner of data organization confers substantial flexibility in data collection and presentation allowing customizable views and solutions to be developed in a relatively straightforward manner.

In one aspect, each Tag 3105 is representative of a reusable component which may comprise one or more tag component members 1322 associated with point data 1110 and/or non-point data 1112. Each Tag 1305 may further be associated with one or more "views"-each of which are representative of a reusable visualization of the information contained within the Tag 1305. In certain embodiments, each view references certain Tag member information including portions of the point data 1110 and non-point data 1112 which may be displayed or visualized in a specified manner. Aspects of Tag visualization in this manner may include the use of animation techniques to graphically depict the Tag's conditions and information.

In various embodiments, each Tag collection 1310 contains a plurality of similarly-defined Tags 1305 each of which may be associated with different selected informational sources 1204, point data sources 1208, or other system components or subcomponents for which point data 1110 and non-point data 1112 may be desirably accessed and visualized. One benefit conferred through the use of the Tag collection 310 and constituent Tags 1305 is that each Tag 1305 sets forth the principal information and fields for inclusion of a point data source 1208 into the Tag collection 1310. Each Tag 1305 may comprise a similar structure and may further provide predefined or default data access rules and operations for accessing point data 1110 and non-point data 1112. Consequently, adding new Tags 1305 (e.g. newly monitored point data sources 1208) may comprise appending additional Tags 1305 to the Tag collection 1310 as needed or desired.

Because of the logical organization of the Tags 1305 and the information contained therein, data integrity even in very large monitoring environments is relatively easy to preserve and the system is highly scalable. Another benefit imparted by the use of Tags 1305 in the aforementioned manner is that rules and operations may be applied across a multiplicity of Tags 1305 with relative ease without the need to independently edit or modify each Tag 1305. Such a feature is useful, for example, when specifying the refresh/update frequency and/or instructions for informational access. The construction of each Tag 1305 provides a mechanism for defining operations "globally" that are subsequently resolved to identify the appropriate point data source 1208 or other component from which the point data 1110 and non-point data 1112 may be obtained.

Performance in the system is improved by providing the ability to define data access constructs for point data 1110 and non-point data 1112 that are suited to the task of acquiring the information at the appropriate frequency. For example, non-point data 1112 may be obtained by database query language queries 1315 such as SQL (Structured Query Language) or SQL-like queries to refresh selected information contained within the Tag collection 1310. Such queries 1315 are suited to access and retrieve generally static information such as non-point data 1112 associated with a selected Tag 1305. In certain implementations, each construct 1315 is configured to access and provide the results of various query columns associated with selected tag component members 1322. Queries 1315 may be associated with both point data 1110 and non-point data 1112 although, in general, queries 1315 are typically directed towards information which changes infrequently (e.g. non-point data 1112).

One or more "Tag" value connections 1320 may further be defined for selected point data associated tag component members 1322 that are determined to change relatively frequently (e.g. current value or set point). In various embodiments, a "Tag" value connection 1320 need be specified only once per Tag component member 1322 of interest. The Tag value connection 320 may further be based on a template or rule which can be generically applied across a portion or substantially all of the Tags 1305 without requiring explicit specification for each Tag 1305.

To improve the flexibility of the system, each Tag 1305 and associated tag component member(s) 1322 may be associated with a name identifier 1325. The name identifier 1325 provides a convenient mechanism to access a specific or desired Tag 1305 and component member(s) 1322 contained therein. Furthermore the name identifier 1325 may be used in connection with formulas, expressions, or rules to provide improved accessibility to the information contained within the Tag 1305. The name identifier 1325 may further be configured such that this information may be used as a reference to indicate an appropriate tag component member 1322 whose value is to be associated with information (e.g. point data 1110 or non point data 1112) from the back-end environment 1100.

Tag rules provide instructions for accessing the appropriate value or information from the desired resource(s) of the back-end data environment 1100. For example, a rule may be defined such that the name identifier 1325 of a selected Tag 1305 is used as a reference to populate a selected tag component member, Current Value 1330 with point data 1110 obtained from a designated resource of the back-end data environment 1100.

As another example, a selected back-end environment resource may comprise an addressable point data source 1208, the value of which is stored in the Current Value field 1330 of a selected Tag 1305. The Current Value field 1330 (as well as other tag component members 1322) may store a wide variety of point data information including current temperatures, speeds, pressures, and other real-time/near real-time information which are desirably monitored and refreshed at a relatively high frequency. Likewise, non-point data 1112 may include attributes associated with the point data 1110 such as machine or instrument names, area, region, organization, unit, high-ranges, low-ranges, units associated with the point data 1110, descriptions of the Tag 1305, and other information. This information may be populated within a selected Tag 1305 using the aforementioned data queries 1315 to provide context to the point data 1112.

In various embodiments, the application environment 1120 may be configured to utilize a combination of data queries 1315 and tag value connections 1320 to identify and acquire appropriate data and information to be accessed from the back-end data environment 1100 and store this information within an appropriate tag component member 1322 (e.g. for example in a temperature-associated TAG and a pressure-associated TAG). As previously indicated to preserve bandwidth and improve system performance each point data 1110 and non-point data 1112 request may be associated with various selected refresh frequencies to maintain a balance between keeping information within the Tag 1305 up-to-date and avoiding unnecessary data requests.

While the Tag collection shown in FIG. 8 is composed of a plurality of Tags of homogeneous composition, it will be appreciated that other Tag collections can be readily devised in accordance with the various embodiments of the invention, the composition of which may comprise additional/different tag component members 1322. It one aspect, it may be desirable to maintain a Tag collection having a singular Tag composition defined by substantially identical tag component members 1322 (e.g. similar to that shown). Such a configuration desirably conveys uniformity amongst all point data 1110/non-point data 1112 acquisitions. However, it is conceived that instances exist where a Tag collection may be desirably formed as a plurality of Tags of heterogeneous composition. Providing multiple compositions of Tags may be useful in accommodating a variety of different point data 1110/non-point data 1112 acquisitions that may or may not be logically or functionally compatible with one another.

FIGS. 9A-9D illustrate examples of the organization of point data 1110 and non-point data 1112 within the system and how this information may be accessed and manipulated. In one aspect, point data 1110 and non-point data 112 may be stored in one or more databases, tables, or intermediate storage data structures such as in tables 1405, 1406. An exemplary non-point data storage mechanism is reflected by table 1405 which may comprise a plurality of fields 1410 associated with a plurality of different point data sources 1208, instruments, apparatuses, devices, or other resources of the back-end data environment 1100. In one aspect, the fields 1410 of the table 1405 represent non-point data 1112 that is expected to change relatively infrequently and may be accessible to the application environment 1120 through the use of the aforementioned data queries 1315. The table 1405 and information contained therein may reside on a selected resource of the back-end environment 1100, a data acquisition system 1215, other back-end data system 1217, or within a portion of the acquisition environment 1120 itself.

In the illustrated example, the fields 1410 of the table 1405 correspond to a NAME field (identifier string) 1415, an ID field (identifier number) 1420, a HLIMIT field (high limit) 1425, a LLIMIT field (low limit) 1430, an EUNIT field (unit associated with point data) 1435, and a DESC field (informational) 1440. Each field may be configured as desired and may for example represent string data or numerical values (real, integer, etc). Each of the fields 1410 serve to characterize or give context to a selected component or point data source 1208 within the system which is to be monitored and associate certain attributes with the component or point data source 1208 in the form of non-point data 1112. The attributes associated with the selected component or point data source 1208 may include descriptive information, operational parameters, as well as, other desired information.

For example, the component entries identified as P100-P102 reflect non-point data/attribute information used to characterize various operational parameters for point data 1110/point data sources 1208 associated with an exemplary pump (e.g. Pump Temperature, Pump Pressure, and Pump Speed). This information may include a designated name (stored in the NAME field), a numerical identifier (stored in the ID field), an upper operational limit (stored in the HLIMIT field), a lower operational limit (stored in the LLIMIT field), units to be associated with point data 1110 obtained from the point data source 1208 (stored in the EUNIT field), and a corresponding brief description of the selected component (stored in the DESC field). Information stored in the fields 1410 may be selectively accessed through the aforementioned data queries 1315 or other retrieval mechanisms to provide tag attribute information which may be subsequently associated with point data 1110 relating to a specific component or point data source 1208 within the back-end data environment 1100.

Similarly, these fields 1410 may also be used in connection with point data 1110/point data sources 1208 associated with an exemplary conveyor (e.g. Conveyor Speed and Conveyor Operational Status). As applied to the conveyor, the fields 1410 may take on different values and context. For example, the name 1415, ID 1420, limits 1425, 1430, units 1435, and description 1440 may be populated to reflect values appropriate to point data sources 1208 associated with the conveyor. Furthermore, certain fields may be left unpopulated, associated with a default value, associated with a void or null value, or populated in other manners depending on the nature of the point data 1110/point data source 1208 which they are associated (e.g. note differences in conveyor speed fields and conveyor operating status fields). Based on the foregoing, it will be appreciated that the fields 1410 of the non-point data/attribute table 1405 may be constructed so as to accommodate substantially all of the information desired to be associated with point data sources 1208 within the system.

Similarly, point data 1110 relating to those components described above may be separately stored in an analogous manner to the aforementioned non-point data as exemplified in table 1406. The information in this table 1406 may comprise one or more fields 1455 including a NAME field (identifier string) 1460, an ID field (identifier number) 1465, and a VALUE field (current/real-time value) 1470. In one aspect, the table 106 containing point data 1110 may represent only limited information relating to each component or point data source 1208 and lack the corresponding descriptive qualities and attribute information associated with the non-point data table 1405. The point data 1110 stored in this table 406 may represent the current or real-time values for each selected component or point data source 1208 which is to be desirably accessed at a relatively high frequency to insure that the information contained in the application environment 1120 is up-to-date. As previously indicated, the information contained in this table 1406 may be acquired through the use of tag value connections 1320 designed to extract selected information from the table 1406 at a desired rate or frequency.

In one aspect, each point data value for a selected point data source 1208 (stored in the VALUE field) may be associated with corresponding identification information (stored in the NAME and ID fields) which may be used to relate the point data 1110 of the table 1406 with the non-point data 1112 of the table 1405. In other embodiments, the point data values may lack corresponding identification information and present only raw-data values. In instances where the point data 1110 lacks or possesses minimal corresponding identification information the application environment 1120 may provide the proper mapping functionalities to associate the point data 1110 with the appropriate non-point data 1112 contained in the table 1405. Taken together the two sources of point data 1110 (acquired from table 1406) and non-point data 1112 (acquired from table 405) may be used to populate a selected tag collection 1310 defined in the application environment 1120.

The exemplary tag collection 1310, tags 1305, and tag component members 1322 shown in FIG. 9A depict the mapping of information from the point data database 1406 and non-point data database 1405. As previously indicated the tag collection 1310 comprises a grouping of Tags or tag instances 1305 representing data structures used for acquisition and association of point data 1110 and non-point data 1112. In various embodiments, the tag collection 310 comprises instantiations of previously defined tag components represented by the one or more tag instances 1305. Each tag instance 1305 comprises tag component members 1322 that may further comprise a member name 1482 and an associated member type 1484. The member type 1484 defines the expected data types of the various tag component members 1322 for each tag instance 1305, for example as real or string values.

The tag collection 1310 may be constructed as a plurality of instantiations of a singular tag component definition or may utilize more than one tag component definition. In general, the tag component definition provides a logical framework for associating point data 1110 and non-point data 1112 in a user-selectable/configurable manner. In one aspect, the tag component definition is constructed in such a manner so as to allow it to be used in a variety of different contexts without being constrained to a particular point data/non-point data association. In certain implementations, a singular tag component definition may be sufficient to accommodate a number of different point data and non-point data associations through one or more instantiations contained within the tag collection 1310.

In one aspect, tag component members 1322 of the tag collection 1310 may be mapped to selected information contained in the point data and non-point data databases 405, 406 using the aforementioned data query 1315/tag value connection 1320 approach. This is shown at a high level in FIG. 9A where selected information reflecting particular point data sources 208 contained in fields 1410 of the point data and non-point data databases 1405, 1406 is mapped to corresponding component members 1322 populating them with the appropriate values or information.

In one aspect, population of the component members 1322 using the data query approach is facilitated by simplified query language. The simplified query language may take the form of a query such as "SELECT NAME, HLIMIT, LLIMIT, EUNIT, DESC FROM TAG_TABLE". The aforementioned simplified query may be translated by the application environment 1120 to one or more suitable database queries (for example in SQL) that may be used to extract information from the non-point data table 1405. The form of the simplified query provides a more intuitive understanding of the operations to be performed in mapping the information without having detailed knowledge of the underlying operations themselves.

FIG. 9B further illustrates an exemplary mapping between the non-point data database 1405 and the exemplary tag collection 1310 shown in FIG. 9A. The aforementioned query may be resolved, in part, by interpreting the language of the query resolving field names 1410 from the non-point data database 1405 and identifying a member name 1482 associated with a particular component member 1322. For example, in the language of the query: NAME, HLIMIT, LLIMIT, EUINT, and DESC reflect fields of the non-point data database 1405 that may be mapped to appropriate member names 1482 associated with particular component members 1322 for tags 1305 within the tag collection 1310. Information may thus be extracted from the non-point data database 1405 and used to populate the TagName, hiLimit, lowLimit, Units, and Description component members 1322 of the appropriate Tag 1305.

Population of point data 1110, which may be updated more frequently, may proceed in a similar manner wherein a mapping functionality is used to associate fields 1455 contained in the point data database 1406 with selected component members 1322 for appropriate tags 1305 in the tag collection 1310. FIG. 9C, illustrates an exemplary point data access/association 1485 for a selected component member 1322 associated with a particular tag 1305 of the tag collection 1310 corresponding to "Current Value" 1486 for which a point data connection may be desirably made. The tag member "CurrentValue" 1486 may be desirably populated with point data 1110 extracted from a selected back-end tag system or point data source 1208 specified as a connection group 1488 (PHD in this example). As previously indicated, the point data information 110 may be acquired from the point table 1406 using a tag value connection 1320 or extracted/sampled directly from the appropriate point data source 1208. In each instance, the corresponding point data 1110 is desirably accessed from the specified location with a desired refresh rate and stored in the appropriate component member 1322 (Current Value in this example).

As described above, tag value connections 1320 and data queries 1315 may be used to "populate" selected tag component members 1322 with desired information from point data and non-point data sources. In various embodiments, query results from data queries 1315 are used in a selected tag instance 305 to fill in the parameters or information associated with the tag value connection(s) defined for the tag 1305. An efficient mechanism for implementing data query information retrieval is to have a single query 1315 perform the operations necessary to return non-point data associated information for a plurality of tag instances 1305. Such a configuration improves resource utilization and reduces overhead associated with executing multiple data queries to achieve similar results.

The tag value connections 1320 may be associated with the point data members 1322 in a singular manner such that a specific tag value connection 1320 is associated with a selected point data member 1322 of a selected tag instance 1305. Here the tag value connection 1320 may be used to define a "formula" or mechanism by which to utilize the non-point data 1112 for a selected tag instance 1305 in addition to other configuration information associated with the tag value connection 1320 to retrieve and populate the point data 1110 for each tag 1305.

In one aspect, as shown in FIG. 9C, forming a tag value connection 1320 comprises specifying the NAME or ID 1490 of the tag 1305 associated with the point data table 14106 or point data source 1208 to identify the information to acquire and the desired field/information 1492 to be extracted (e.g. VALUE). A simplified referencing mechanism for associating a component member 1322 to store extracted point data 1110 with the relevant point data 1110 to be extracted from the table 1406 or point data source 1208 may comprise: Specifying the Tagname identifier (e.g. "% TagName") 1490 along with the request to establish a connection 1486 with a corresponding connection group (e.g. "PHD") 4188 to populate a selected component member with point data 1110 corresponding to the selected field (e.g. "VALUE") 1492. Here, the Tagname identifier "% TagName" indicates that the request to populate the component member 1322 of the Tag 1305 will use this Tag's name field (e.g. "% TagName") at runtime and pass this information to the appropriate back-end data source or connection group (e.g. "PHD") 1488 where the associated information contained in the selected field (e.g. "VALUE") 1492 will be sufficient to uniquely identify the desired value to be accessed.

FIG. 9D illustrates an exemplary joined table or collection 1494 of point data 1110 and non-point data 1112 that may be formed by applying the aforementioned data access principles to acquire data from the point data table 1406 and non-point data table 1405. One desirable feature of forming such a joined table or collection 1494 is that each Tag 1305 and its constituent components 1322 may be represented and available as an independent object with the benefits and display capabilities of an object. Thus, each Tag 1305 associated with the joined table 1494 may be represented as an object having any number of class-based views available to display the content (e.g. component members 1322) of the Tag 1305. Construction and presentation of data in this manner therefore improves the functional capabilities of a data acquisition system by allowing the merging of point data 1110 and non-point data 1112 in a single coherent table or view. Additionally, the joined data is made more accessible by providing means to conveniently relate data types that are normally not readily combinable using conventional systems.

As will be appreciated from the aforementioned description, different data acquisition strategies (e.g. structured queries/tag value connections), as well as, different data acquisition times/retrieval intervals may be implemented to populate the various fields (e.g. component members 1322) relating to one of more Tags 1305 described by the joined table 1494. One desirable benefit provided by ordering the information in such a manner is that a portion or the substantial entirety of non-point data 1112 may be identified and acquired by as little as a single structured query 1315 thus significantly reducing computational load, programmatic complexity, and communications bandwidth.

The above-described embodiments may be altered to create completely or partially different embodiments without departing from the spirit and scope of the appended claims.

What is claimed is:

1. A method to update a data structure based on a plurality of parent data structures, at least one of the plurality of parent data structures associated with point data, the method comprising:
   receiving a notification to update from one of the plurality of parent data structures;
   in response to the notification and prior to updating the data structure, determining that one or more other ones of the plurality of parent data structures is updating;
   prior to updating the data structure, determining if a notification to update has been received from each of the one or more other ones of the plurality of parent data structures; and
   updating the data structure based on data of the one or more of the plurality of parent data structures only if a notification to update has been received from each of the one or more other ones of the plurality of parent data structures.

2. The method according to claim 1, wherein receiving the notification to update comprises:
   determining that the one of the plurality of parent data structures has completed updating.

3. The method according to claim 2, wherein determining that the one of the plurality of parent data structures has completed updating comprises:
   determining a change to an update status flag associated with the one of the plurality of parent data structures.

4. The method according to claim 1, wherein receiving the notification to update comprises:
   receiving, from the one of the plurality of parent data structures, a call to a method exposed by the data structure.

5. The method according to claim 1, further comprising:
   after updating the data structure, transmitting a notification to update to each child data structure of the data structure.

6. The method according to claim 5, wherein transmitting the notification comprises:
   calling a method exposed by each child data structure of the data structure.

7. The method according to claim 5, wherein transmitting the notification comprises:
   changing an update status flag associated with the data structure.

8. The method according to claim 1, further comprising:
   populating a first one of the plurality of parent data structures with point data generated by an industrial monitoring system; and
   populating a second one of the plurality of parent data structures with point data generated by a supervisory control and data acquisition system.

9. The method according to claim 1, wherein one of the plurality of parent data structures comprises a base data structure, and further comprising:
   caching data associated with the base data structure;
   receiving updated data associated with the base data structure;
   determining that a size of the base data structure is less than a threshold size; and
   if the size of the base data structure is less than the threshold size, comparing the cached data with the updated data to determine if the updated data is different from the cached data.

10. The method according to claim 9, further comprising:
    if the updated data is not different from the cached data, not updating the base data structure based on the updated data.

11. A non-transitory medium storing program code executable by a system to update a data structure based on a plurality of parent data structures, at least one of the plurality of parent data structures associated with point data, the program code comprising:
    code to receive a notification to update from one of the plurality of parent data structures;
    code to determine, in response to the notification and prior to updating the data structure, that one or more other ones of the plurality of parent data structures is updating;
    code to determine, prior to updating the data structure, if a notification to update has been received from each of the one or more other ones of the plurality of parent data structures; and
    code to update the data structure based on data of the one or more of the plurality of parent data structures only if a notification to update has been received from each of the one or more other ones of the plurality of parent data structures.

12. The medium according to claim 11, wherein the code to receive the notification to update comprises:
    code to determine that the one of the plurality of parent data structures has completed updating.

13. The medium according to claim 11, wherein the code to receive the notification to update comprises:
    code to receive, from the one of the plurality of parent data structures, a call to a method exposed by the data structure.

14. The medium according to claim 11, the program code further comprising:
    code to transmit a notification to update to each child data structure of the data structure, after updating the data structure.

15. The medium according to claim 14, wherein the code to transmit the notification comprises:
    code to call a method exposed by each child data structure of the data structure.

16. The medium according to claim 11, the program code further comprising:
    code to populate a first one of the plurality of parent data structures with point data generated by an industrial monitoring system; and code to populate a second one of the plurality of parent data structures with point data generated by a supervisory control and data acquisition system.

17. The medium according to claim 11, wherein one of the plurality of parent data structures comprises a base data structure, and the program code further comprising:
code to cache data associated with the base data structure;
code to receive updated data associated with the base data structure;
code to determine that a size of the base data structure is less than a threshold size; and
code to compare, if the size of the base data structure is less than the threshold size, the cached data with the updated data to determine if the updated data is different from the cached data.

18. The medium according to claim 17, the program code further comprising:
code to not update, if the updated data is not different from the cached data, the base data structure based on the updated data.

19. A system comprising:
a device comprising a first parent data structure associated with first point data, the first parent data structure to transmit a first notification to update in response to updating the first data;
a device comprising a second parent data structure associated with second point data, the second parent data structure to transmit a second notification to update in response to updating the second data; and
a device comprising a child data structure associated with third point data, the child data structure to receive the first notification, to determine, in response to the notification and prior to updating the child data structure, that the second parent data structure is currently updating, to wait to update the third data until the second notification is received, to receive the second notification, and, in response to receipt of the second notification, to update the third data based on one or both of the first updated data and the second updated data.

20. The system according to claim 19, wherein transmission of the first notification to update comprises:
changing an update status flag associated with the first parent data structure.

21. The system according to claim 20, wherein transmission of the second notification to update comprises:
changing an update status flag associated with the second parent data structure.

22. The system according to claim 19, wherein transmission of the first notification to update comprises:
calling a method exposed by the child data structure.

23. The system according to claim 22, wherein transmission of the second notification to update comprises:
calling the method exposed by the child data structure.

24. The system according to claim 19, further comprising:
a second child data structure, the second child data structure associated with fourth point data, the second child data structure to receive the first notification, to determine that the child data structure is currently updating, to wait to update the fourth data until a third notification is received, to receive the third notification, and, in response to receipt of the third notification, to update the fourth data based on one or both of the first updated data and the third updated data,
wherein the child data structure is to transmit the third notification.

25. The system according to claim 19, further comprising:
a second child data structure, the second child data structure associated with fourth point data, the second child data structure to receive the first notification, to determine that the second parent data structure is currently updating, to wait to update the fourth data until the second notification is received, to receive the second notification, and, in response to receipt of the second notification, to update the fourth data based on one or both of the first updated data and the second updated data.

26. The system according to claim 19, further comprising:
a third parent data structure associated with fourth point data, the third parent data structure to transmit a third notification to update in response to updating the fourth data,
wherein the child data structure is to determine that the third parent data structure is currently updating, to wait to update the third data until the third notification is received, to receive the third notification, and, in response to receipt of the third notification, to update the third data based on one or more of the first updated data, the second updated data, and the third updated data.

27. The system according to claim 19, wherein the first parent data structure, the second parent data structure, and the third parent data structure comprise instantiations of software objects.

* * * * *